United States Patent [19]

Sandiford et al.

[11] Patent Number: 4,643,255

[45] Date of Patent: Feb. 17, 1987

[54] GEL AND PROCESS FOR PREVENTING LOSS OF CIRCULATION, AND COMBINATION PROCESS FOR ENHANCED RECOVERY

[75] Inventors: Burton B. Sandiford, Balboa Island, Calif.; Roger C. Zillmer, Bloomington, Minn.

[73] Assignee: Cities Service Oil and Gas Corporation, Tulsa, Okla.

[21] Appl. No.: 810,939

[22] Filed: Dec. 18, 1985

Related U.S. Application Data

[63] Continuation-in-part of Ser. No. 623,915, Jun. 25, 1984, abandoned.

[51] Int. Cl.$^4$ .................................... E21B 33/138
[52] U.S. Cl. ................................ 166/295; 166/281; 166/300; 175/72; 523/130
[58] Field of Search .................. 166/294, 295, 300; 175/72; 252/8.5 LC; 523/130

[56] References Cited

U.S. PATENT DOCUMENTS

| | | | |
|---|---|---|---|
| Re. 31,748 | 11/1984 | Block | 252/8.5 A |
| 2,650,195 | 8/1953 | Cardwell et al. | 175/72 |
| 2,720,501 | 10/1955 | Van Ness | 524/61 |
| 2,787,325 | 4/1957 | Holbrook . | |
| 3,047,066 | 7/1962 | Mosely . | |
| 3,080,207 | 3/1963 | Tanabe | 8/115.5 |
| 3,208,524 | 9/1965 | Horner et al. | 252/8.5 LC X |
| 3,251,795 | 5/1966 | Fukushima et al. | 524/557 |
| 3,265,536 | 8/1966 | Miller et al. . | |
| 3,316,965 | 5/1967 | Watanabe | 175/72 X |
| 3,396,790 | 8/1968 | Eaton . | |
| 3,452,817 | 7/1969 | Fallgatter | 166/305 R |
| 3,593,794 | 7/1971 | Fischer et al. | 175/72 X |
| 3,640,734 | 2/1972 | Oppenheimer et al. | 99/176 |
| 3,663,470 | 5/1972 | Nishimura et al. | 260/2.5 F |
| 3,713,488 | 1/1973 | Ellenburg | 175/72 X |
| 3,740,360 | 6/1973 | Nimerick | 175/72 X |
| 3,741,307 | 3/1973 | Sandiford et al. | 166/273 |
| 3,746,109 | 7/1973 | Darley | 175/72 X |
| 3,757,863 | 9/1973 | Clampitt et al. | 166/270 X |
| 3,762,476 | 10/1973 | Gall | 166/294 |
| 3,785,437 | 1/1974 | Clampitt et al. | 166/281 |
| 3,794,115 | 2/1974 | Skagerberg | 166/294 |
| 3,795,276 | 3/1974 | Eilers et al. | 166/295 |
| 3,818,998 | 6/1974 | Hessert | 175/72 |
| 3,859,269 | 1/1975 | Maurer . | |
| 3,875,074 | 4/1975 | Vassiliades et al. | 252/316 |
| 3,912,529 | 10/1975 | Kotani et al. | 106/187 |
| 3,926,918 | 12/1975 | Shibata et al. | 260/73 L |
| 3,941,730 | 3/1976 | Solenberger . | |
| 4,015,995 | 4/1977 | Hess | 166/295 X |
| 4,018,286 | 4/1977 | Gall et al. | 166/295 |
| 4,154,912 | 5/1979 | Phillips et al. . | |
| 4,261,421 | 4/1981 | Watanabe | 166/300 X |
| 4,262,067 | 4/1981 | Phillips et al. . | |
| 4,272,470 | 6/1981 | Hsu et al. . | |
| 4,336,145 | 6/1982 | Briscoe | 252/8.55 R |
| 4,349,443 | 9/1982 | Block | 252/8.5 A |
| 4,353,804 | 10/1982 | Green et al. | 252/8.5 A |
| 4,376,183 | 3/1983 | Haskell | 524/417 |
| 4,385,155 | 5/1983 | Michaels | 525/61 |
| 4,389,319 | 6/1983 | Block et al. | 252/8.5 A |
| 4,411,800 | 10/1983 | Green et al. | 252/8.5 A |
| 4,424,302 | 1/1984 | Block et al. | 252/8.5 A |
| 4,428,845 | 1/1984 | Block | 525/58 |
| 4,447,341 | 5/1984 | Block | 252/8.5 A |
| 4,472,552 | 9/1984 | Blouin | 525/61 |
| 4,473,480 | 9/1984 | Green et al. | 252/8.5 A |
| 4,485,875 | 12/1984 | Falk | 166/295 |
| 4,486,318 | 12/1984 | Green et al. | 252/8.5 A |
| 4,498,540 | 2/1985 | Marrocco | 166/295 |

FOREIGN PATENT DOCUMENTS

| | | |
|---|---|---|
| 950355 | 7/1974 | Canada . |
| 356408 | 9/1931 | United Kingdom . |
| 2073228 | 10/1981 | United Kingdom . |
| 2074636A | 11/1981 | United Kingdom . |

OTHER PUBLICATIONS

Journal of Colloid & Interface Science, vol. 90, No. 1, Nov. 1982, pp. 34–43.
Journal of the Electrochemical Society, vol. 130, No. 2, Feb. 1983, pp. 255–259.
U.S. Government Doc. N81-29531 (NASA Case No. LEW-13, 102-1).

*Primary Examiner*—George A. Suchfield
*Attorney, Agent, or Firm*—F. Eugene Logan; William N. Patrick

[57] ABSTRACT

A rapid setting gel-forming composition is provided comprising a first substance selected from the group consisting of a polyvinyl alcohol, a polyvinyl alcohol copolymer, and mixtures thereof, and aldehyde, and water, which is useful in preventing the loss of circulation fluids in well drilling, completion of workover operations. A combination process is also provided using a slower setting gel-forming composition for retarding the flow of waters or brines in high permeable non-productive channels in combination with a subsequent acidizing step for increasing the permeability of low porous structure in subterranean formations. The combination process is particularly useful in waterflood operations to increase the sweep efficiency of the oil recovery process while improving the flow oil and drive water in the productive parts of the reservoir.

24 Claims, No Drawings

GEL AND PROCESS FOR PREVENTING LOSS OF CIRCULATION, AND COMBINATION PROCESS FOR ENHANCED RECOVERY

RELATED APPLICATIONS

This application is a continuation-in-part application of Ser. No. 623,915 filed June 25, 1984, now abandoned, which is incorporated herein by reference.

TECHNICAL FIELD

This invention relates to gels, and processes for forming and using the gels. A polyvinyl alcohol based-aldehyde hydrogel, or gel, is provided which is useful for immobilizing large volumes of earth or water. One of the gels can be used for reducing the loss of drilling, completion or workover fluids from a wellbore. Other gels can be used for reducing the permeability of subterranean formations to the flow of fluids, waters or brines. The various gels of this invention are particularly valuable in retarding the flow of fluids, waters or brines in hydrocarbon production from a wellbore.

The subject matter of this application is related to that of commonly assigned U.S. Pat. No. 4,498,540, for "Gel for Retarding Water Flow" and our Ser. No. 624,111, filed June 25, 1984, now abandoned, for "Gel and Process for Retarding Fluid Flow" which are hereby incorporated herein by reference.

BACKGROUND OF THE INVENTION

The recovery of hydrocarbons, both liquid and gaseous, from subterranean zones has frequently resulted in the simultaneous production of large quantities of water or brines. In some cases, even though substantial flows of hydrocarbons have been shown, water production is so great and water disposal costs so high, that hydrocarbon production is not economical. Such water production has in some cases been disposed of in an abandoned or dry well by separating such water from the hydrocarbons and reinjecting the separated water into such wells. Where a disposal well is not available nor near the producing well, pipelining the water product over a long distance to a disposal site can become so costly that it renders the well noncommercial. Even if a disposal well is close by, the disposal cost can still be very expensive. Therefore it is desirable to find a way to reduce or shut off the flow of water while permitting hydrocarbon production to continue.

It is well known that the production of large amounts of water from hydrocarbon producing wells is a major expense item in the overall hydrocarbon recovery cost. It is not uncommon for an oil well to produce an effluent which is 60–99% by volume water and only 1–40% by volume oil. In such situations, the major part of the pumping energy is expended in lifting water from the well, a cost which the producer would like to avoid if possible. The effluent must then be subjected to a costly separation procedure to recovery water-free hydrocarbons. The foul water separated therefrom also presents a troublesome and expensive disposal problem. Consequently, it is desirable to decrease the volume of water produced from hydrocarbon wells. It is, of course, desirable to be able to achieve this objective and at the same time not marer!ally affect the hydrocarbon recovery rate. However, where the volume of water is very high, e.g., 80 to 99% water, and only 1–20% oil, even substantial reduction in hydrocarbon production can be tolerated if water production can be substantially reduced.

One such method of reducing the flow of water has been described in U.S. Pat. No. 3,762,476 wherein a first aqueous polymer solution selected from the group consisting of polyacrylamide, a partially hydrolyzed polyacrylamide, a polysaccharide, a carboxymethylcellulose, a polyvinyl alcohol, and polystyrene sulfonate, is injected into a subterranean formation. Thereafter, a complexing ionic solution of multivalent cations and retarding anions, and which also comprises aluminum citrate, is injected into the subterranean formation. The multivalent cations are selected from the group consisting of Fe(II), Fe(III), Al(III), Ti(IV), Zn(II), Sn(IV), Ca(II), Mg(II), Cr(III), and the retarding anions are selected from the group consisting of acetate, nitrilotriacetate, tartrate, citrate, phosphate. Brine is then injected followed by a second slug of an aqueous polymer solution which can be the same or different from the first aqueous polymer solution. In any event, the complexing ionic solution of multivalent cations and retarding anions is capable of gelling both the first and second aqueous polymer solution.

Water produced from a wellbore can come from the infiltration of naturally occuring subterranean water as described above, or the water can come from injected water put into the formation in those hydrocarbon recovery processes which utilize waterflooding. U.S. Pat. No. 4,098,337 discloses a method for forming a hydroxymethylated polyacrylamide gel, in situ, to reduce the permeability of a thusly treated zone where the waterflood method of oil recovery is employed. In this case the gel was formed in situ by the injection of an aqueous polyacrylamide solution and a aqueous formaldehyde solution.

In waterflood operations it can be desirable to treat the water injector wells with a polymer gel forming solution to control and/or redirect the water flow profile. Such treatment can prevent channeling of water at the injector well and/or control or redirect the water flow through regions of varying permeability.

Although polyacrylamide-based gels can be effective in retarding water production or flow in some subterranean formations, polyacrylamide-based gels will not be stable or effective in all formations. In general, polyacrylamide-based gels will work satisfactorily in formations having a temperature below about 65° C. Above about 65° C., Polyacrylamide-based gels become very sensitive to hardness of the brines, especially where hardness is above about 1000 ppm. The hardness of the water becomes a more detrimental factor the higher the temperature, thus for very hot regions even low hardness levels can render many gels ineffective. Formations which have a higher temperature, hardness, or total dissolved solids content above the aforementioned ranges usually are not capable of being successfully treated with polyacrylamide-based polymers to retard the flow of water.

In many hydrocarbon producing wells temperatures of 80° C. or higher are often encountered. Formation waters frequently have hardnesses which exceed 1000 ppm. It is therefore desirable to develop a gel which can be used to retard or block the flow of water in subterranean formations having a temperature of 65° C. or higher, and a water hardness of 1000 ppm or higher.

In other flooding operations, rather than water, other fluids can be used. Some fluids which are used are carbon dioxide and steam. Because of the high temperature required in steam flooding or other steam stimulation methods, many of the gels used for blocking water are not suitable or satisfactory for blocking steam. Other steam treating methods such as "Push and Pull" operations, sometimes referred to aa "cyclic steam injection" or "Huff and Puff" operations, where a production well is steamed for several days and then produced for a month or so result in steam channels being formed which if not blocked will result in an inefficient steaming operation due to loss of steam into channels which drain into nonproductive parts of the reservoir. Again because many of the existing gels degrade rapidly at steam temperatures, polymers such as polyacrylamides are generally not satisfactory. Other fluids such as carbon dioxide can also be used in push and pull operations.

Flooding operations using carbon dioxide and other gases as the drive fluid frequently experience a loss of drive fluid to nonproductive parts of the reservoir because of greater ability of gases to dissipate into such channel as opposed to liquids. Loss of drive gases in flooding operations and steam in stimulation methods is more difficult to prevent because the flow channels responsible for such losses can be very small in diameter or width thereby making it very difficult to fill such channels with a blocking agent. Some viscous plugging substances, even though they may have the desired stability at higher temperatures, are not able to penetrate and effectively fill narrow channels, particularly as such channels become more distant from the wellbore.

Thus there is a need for plugging fluids which can be formulated to penetrate deeply into the formation. The use of this invention addresses this problem and provides polyvinyl alcohol based gels which can be tailor made to the particular problem at hand and which can overcome many of the shortcomings of prior art plugging agents and gels.

Polyvinyl alcohol gels have been used to protect well casings from corrosion. U.S. Pat. No. 2,832,414 discloses such a method wherein an aqueous solution of a water soluble polyvinyl alcohol which is capable of forming a gel if maintained in a quiescent state, is pumped into the annular space between the casing and the wall of the bore hole. After allowing the polymer to remain quiescent over a period of time a gel is formed. The thusly formed gel prevents the intrusion of formation water into the annular space thereby reducing corrosion of the metal casing. Apparently, no crosslinking agent is employed and for that reason is not believed that this particular gel would be useful for plugging channels or fractures on a permanent bases. Furthermore, in U.S. Pat. No. 2,832,414 the gel is used to fill a relatively large but stagnant cavity compared to the volume of a typical channel in a subterranean formation associated with hydrocarbon production from a wellbore.

Studies of the macroscopic changes in polyvinyl acetate gels that occur upon removal from swelling equilibrium with isopropyl alcohol were reported in the Journal of Colloid and Interface Science, Vol. 90, No. 1, November 1982, pages 34 to 43. These studies were conducted using films of gels having various degrees of crosslinking and polymer concentration. The polyvinyl acetate gels were formed from precursor polyvinyl alcohol gels that were crosslinked with glutaric dialdehyde which were then converted to acetate gels by polymer homologous acetylation.

U.S. Pat. No. 3,265,657 discloses a process for preparing an aqueous polyvinyl alcohol composition, which remains fluid for at least a few seconds after preparation and spontaneously gels thereafter. The gel is formed by contacting a gelable fluid aqueous polyvinyl alcohol solution with a hexavalent chromium compound and a reductive agent to convert CR(VI) to Cr(III). The compositions are used to produce foams suitable as insulating, acoustical, and packaging materials. The gels are crosslinked with chromium, not an aldehyde.

U.S. Pat. No. 3,658,745 discloses a hydrogel which is capable of significant expansion upon cooling in water and reversible shrinking upon heating which comprises a crosslinked acetalated hydrogel formed by reacting a polyvinyl alcohol previously dissolved in water and a monaldehyde and a dialdehyde. The hydrogels are alleged to have sufficient crosslinking to prevent imbibition of macromolecular materials such as proteins but not the imbibition of micromolecular materials such as low molecular weight water solutes. These hydrogels are alleged to be useful for dialytic purification when pure water is added to the macromolecular solution after each cycle. Apparently these particular hydrogels are able to absorb and desorb water and microsolutes with alternate cooling and heating cycles. Apparently a major amount of shrinkage of these gels occurs upon slight heating such as from 12° to 37° C. which indicates that these gels would have little value for blocking water in subterranean formations, especially at temperatures of 37° C. or higher.

SUMMARY OF THE INVENTION

By the term "aldehyde" as used herein is meant a monoaldehyde, a dialdehyde, a polyaldehyde, and any of the former whether substituted or unsubstituted. Preferably the aldehyde contains two functional groups such as dialdehyde or a substituted monoaldehyde as used herein is meant to include unsaturated carbon-carbon bond as well as substitution of functional groups. Nonlimiting examples of substituted monoaldehyde are acrolein and acrolein dimethylacetal. Polyaldehydes can be used and may in some cases be more desirable, however, polyaldehydes are not as available commercially as dialdehydes and as a consequence use of polyaldehydes may not be practical.

Non-limiting examples of dialdehyde crosslinking agents are glyoxal, malonaldehyde, succinaldehyde, glutaraldehyde, adipaldehyde, terephthaldehyde. Non-limiting examples of dialdehyde derivatives are glyoxal bisulfite addition compound

Na$_2$HC(OH)SO$_3$CH(OH)SO$_3$, glyoxal trimeric dihydrate, malonaldehyde bisdimethylacetal, 2,5-dimethoxytetrahydrofuran, 3,4-dihydro-2-methoxy-2H-pyran, and furfural. Acetals, hemiacetals, cyclic acetals, bisulfite addition compounds, shiff's bases or other compounds which generate dialdehydes in water, either alone or in response to an additional agent such as an acid or a condition such as heat are also meant to be included in the term "aldehyde" as used and claimed herein.

Non-limiting examples of monoaldehyde with a second functional group in addition to the aldehyde group are acrolein and acrolein dimethylacetal.

Non-limiting examples of polyaldehydes are polyacrolein dimethylacetal, addition products of acrolein for example, ethylene glycol plus acrolein, and glycerol plus acrolein.

By the term "acidic catalyst" or "crosslinking catalyzing substance" as used herein is meant a substance which is a proton donor or a substance which in its environment will form or become a proton donor. All acids are operable as an acidic catalyst in the gel systems described herein, for example, Bronsted acids such as mineral and carboxylic acids, or Lewis acids. Non-limiting examples of a Lewis acid are zinc chloride, ferrous chloride, stannous chloride, aluminum chloride, barium fluoride, and sulfur trioxide. Some of these chemicals hydrolyse in water to produce metal oxides or hydroxides and HCl or HF. The rate of hydrolysis of many Lewis acids is dependent on temperature and the other dissolved compounds in the solution. The rate of production of the acidic catalyst, HCl, from some of the above Lewis acida determines the rate of gel formation.

A delayed action catalyst is a substance which is not acidic in and of itself, but which generates an acidic catalyst slowly on interaction with water at the temperature of interest. For example, the rate of generation of the acid in oil well usage is usually controlled by the reservoir temperature experienced during the in-situ gel formation. In many applications the rate of acidic catalyst generation or release can be controlled by the gel-forming fluid formulation to range from a few minutes to a few days or more.

The acid catalyst can be a two component system, for example, a two component delayed action catalyst can comprise a first component which will react with a second component, to form an acidic catalyst. A non-limiting example of such a two component delayed action catalyst is sodium persulfate and a reducing agent. In such a delayed catalyst system the sodium persulfate reacts with the reducing agent to produce sulfuric acid. In another two component delayed action catalyst system the reaction product of the two components can react with water to form the acidic catalyst.

The acidic catalyst and/or delayed action catalyst must, of course, have some solubility in water. However, in some oil field usages the partial solubility of the acidic catalyst in the oil product can be advantageous if treatment is to include subterranean zones containing both oil and water. The fraction of the acidic catalyst or delayed action catalyst which dissolutes in oil will, of course, not be available to catalyze the gel formation reaction in such zones of high oil content; consequently such oil-water zones will not be blocked by gel formation to the same extent as those zones with little or no oil present.

Non-limiting examples of delayed action catalysts are methyl formate, ethyl formate, methyl acetate, ethyl acetate, glycerol monoacetate or acetin and glycerol diacetate or diacetin.

Laboratory tests conducted on core samples have shown that diacetin hydrolysis more slowly than methyl formate at all temperatures including the higher temperatures. Therefore, where subterranenan formations having higher temperatures are encountered, diactin or acetin because of their slower rate of hydrolysis are used to provide a longer time for crosslinking reactions to occur and hence provide a longer time for the gelling forming fluids to penetrate into the pores of such subterranean zones before gelation occurs. Non-limiting examples of delayed action catalyst and their acidic catalyst product are:

| Delayed Action Catalyst | Acidic Catalyst Product |
|---|---|
| Methyl formate | Formic acid |
| Glycerol diacetate | Acetic acid |
| Sodium persulfate | Sulfuric acid |
| Sodium dodecyl sulfate | Sulfuric acid |
| Methyl methane sulfonate | Methylsulfonic acid |
| Sodium triiodide/sodium bisulfate/water | Hydroiodic acid |

Therefore, delayed action acidic catalysts can be esters which slowly hydrolyze in water, the rate of hydrolysis being dependent on temperature and initial pH. Other delayed action catalysts are the analogs of esters and acids such as sulfones, xanthates, xanthic acids, thiocyanates, and the like. In some of these examples, hydrolysis produces an acidic catalyst which speeds the crosslinking reaction and an alcohol which does not affect gel formation. An example of a delayed action acidic catalyst is methyl formate which is influenced by the environment with respect to the rate of formation of acid. For example, the higher the temperature, the faster methyl formate will hydrolyze and generate formic acid.

By the term "Bronsted acid" as used herein is meant a chemical which can act as a source of protons. By the term "Lewis acid" as used herein is meant a chemical that can accept an electron pair from a base. By the term "delayed action acid" as used herein is meant any acidic catalyst which makes available or generates donor proton over a period of time or after an initial period of time either as a consequence of its characteristic or the characteristics of the environment in which it is used.

By the term "gel" as used herein is meant a chemically crosslinked three-dimensional elastic network of long-chain molecules with a certain amount of immobilized solvent (diluent) molecules.

By the term "PVA based substance" or "PVA" (frequently referred to herein as the "first substance") as used herein is meant long-chain molecules selected from the group consisting of polyvinyl alcohols, polyvinyl alcohol copolymers, and mixtures thereof.

By the term "PVA-aldehyde gel" as used herein is meant a chemically crosslinked three-dimensional elastic network of longchain molecules selected from the group consisting of a polyvinyl alcohol, a polyvinyl alcohol copolymer, and mixtures thereof, crosslinked with an aldehyde, and containing a certain amount of immobilized and chemically bound water molecules.

By the term "PVA-glutaraldehyde gels" as used herein is meant a chemically three-dimensional elastic network of various PVA based substances crosslinked with glutaraldehyde and containing a certain amount of immobilized and chemically bound water molecules.

By the term "water" as used herein is meant to include any source of water, including brine, sea water, brackish water, formation water, fresh water and pure water. Furthermore the brine can be saturated and at an elevated temperature.

All of the above mentioned acidic catalysts are effective crosslinking catalyzing substances for PVA-aldehyde and PVA-glutaraldehyde gel systems.

Non-limiting examples of polyvinyl alcohol copolymers are polyvinyl alcohol-co-crotonic acid, polyvinyl alcohol-co-acrylic acid, polyvinyl alcohol-co-methacrylic acid, polyvinyl alcohol-co-vinylpyridine, and polyvinyl alcohol-co-vinylacetate, the latter of which is frequently present in small amounts in commercial grade polyvinyl alcohols.

A problem which sometimes occurs in the oil field is the loss of circulation of special fluids such as drilling, completion and workover fluids into the subterranean formation. Loss of circulation fluids into the formation can cause damage to the drill bit caused by overheating and large decrease in drilling rate either of which can cause large increases in the cost of drilling, collapse of the formation at the wellbore which can damage the wellbore beyond repair, or in-depth plugging of the formation which can damage the reservoir to such an extent that the reservoir may have to be abandoned.

In order to stop or retard the loss of circulation fluids into the reservoir it is desirable to plug the flow passages responsible for such losses very quickly. Cements and silicates are frequently used, however, because of the flow properties of cement and silicates completely effective plugging is not always achieved. The large particles in cement prevent it from penetrating much beyond 8 centimeters (8 cm) into the low flow rate channels. Whereas in high flow rate channels the cement often does not stop the loss of circulation fluids probably because the cement did not set, which could be because of dilution due to formation water infusion or merely because the fast flow rate prevented setting. Cement plugs near the wellbore are frequently short circuited by the circulation fluid shortly after the resumption of drilling, completion, or workover operation. Thus, there is a need for a system that will plug both low flow and high flow rate channels adjacent a wellbore and not allow circulation fluids to pass.

The PVA-aldehyde gel systems of this invention can penetrate the formation for distances much greater than 8 cm whether the formation be a sand-like or carbonate-type matrix, and also stick to the matrix after gelation. The gel times of PVA-aldehyde gel systems can be varied from a couple of minutes to days. However, in most cases drilling, completion or workover operations is very costly. Consequently time delays are avoided wherever possible. Loss of circulation fluid problems therefore need to be corrected rapidly. Fast setting plugging agents for use close to the wellbore are a long sought solution to the problem.

In serious lost circulation cases often 20 cubic meters or 120 barrels or more of circulation fluid can be lost in 10 minutes.

In our invention, there is provided rapid setting PVA-aldehyde gels formulated so that they are gelled within a period of time from about 1 second to no greater than 12 minutes, and preferably from immediately or almost immediately to about 10 minutes, i.e. from about 1 second to about 10 minutes, after formulation. These gels can be partially formulated at the surface but completely formulated in the wellbore preferably at or near the point of lost circulation. Our gel-forming compositions are gelled in the presence of an acidic catalyst, which in combination with the amount of aldehyde, causes a rapid setting of the gel to occur. In one embodiment the acidic catalyst is added to the gel-forming mixture either in the wellbore or preferably at or near the point of lost circulation. In another embodiment the aldehyde is the last component of the gel-forming composition to be added to the mixture and it is added at the wellbore near the point of lost circulation. The use of such rapid setting PVA-aldehyde gel systems offers additional advantages of ease of wellbore clean-up as opposed to cements, and greater elevated temperature stability over other gel systems such as polyacrylamide based gels which in general are not stable at temperatures of 65° C. or higher. Our PVA-aldehyde gel-forming compositions also have the advantage that they can be formulated using formation brine rather than merely fresh water which is substantially pure water, that is $H_2O$. This compatibility is an important advantage in locations where fresh water is not readily available. The brine can be saturated with dissolved salt and be hot or near its boiling point. Some hot saturated brines near their boiling points can contain as much as about 30% by weight dissolved salt or as little as about 70% by weight $H_2O$. Exact amounts of dissolved salt will vary depending on the various species of salts involved and the extent of any supersaturation. For example a gel-forming composition which is 91% by weight brine, wherein the brine is saturated and has a $H_2O$ content of 70% by weight, will be about 64% by weight $H_2O$.

Accordingly, there is provided a process for reducing the loss of circulation fluids into flow passages of a subterranean formation during a well drilling, completion or workover operations, the circulation fluids being selected from the group consisting of drilling fluids, completion fluids and workover fluids, the process comprising stopping the injection of the circulation fluid into the wellbore; introducing into the flow passages, an effective amount of a gel-forming composition comprising (i) an aqueous solution comprising a first substance selected from the group consisting of polyvinyl alcohols, polyvinyl alcohol copolymers, and mixtures thereof, (ii) an amount of a second substance selected from the group consisting of aldehydes, aldehyde generating substances, acetals, acetal generating substances, and mixtures thereof capable of crosslinking with the first substance through the formation of acetal crosslinkages, and (iii) an amount of a crosslinking catalyzing substance, which in combination with the amount of the aldehyde is operable for effecting gelation, at the temperature of the subterranean formation, of the gel-forming composition in a period of time no greater than about 12 minutes after the gel-forming composition is formulated or introduced into the subterranean formation; and allowing the gel-forming composition to flow into the flow passages and to form a gel therein within such period of time thereby reducing the loss of circulation fluid upon resuming well drilling, completion or workover operation. In one embodiment the total aldehyde content of the gel-forming composition is from about 0.03 to about 10% of the weight of the gel-forming composition or thusly formed gel. In a preferred embodiment the amounts of a crosslinking catalyzing substance and aldehyde are operable for effecting gelation, at the temperature of the subterranean formation, of the gel-forming composition in a period of time from about zero, or one second, to about 10 minutes after being formulated or introduced into the subterranean formation.

In one embodiment of our rapid setting gel-forming composition, the amount of the second substance or aldehyde is from about 0.03 to 10 percent of the weight of the gel-forming composition or gel, and the pH of the gel-forming composition is no greater than about 5.5. In one embodiment the second substance or aldehyde is from about 0.03 to about 5 percent of the weight of the gel-forming composition or gel. In another embodiment the second substance or aldehyde is from about 0.03 to about 4 percent of the weight of the gel-forming composition or gel. In still another embodiment the second substance or aldehyde is from about 2 to about 3 percent of the weight of the gel-forming composition or gel. Preferably the pH of the gel-forming composition is no greater than about 5 or about 4. In one embodiment the pH of the gel-forming composition is from about 2 to about 5. In another embodiment of the amount of the second substance or aldehyde is no more than about 2 percent of the stoichiometric amount required to react with all of the crosslinkable sites of the first substance. In another embodiment the aldehyde is glutaraldehyde. In yet another embodiment the gel-forming composition is at least about 64 weight percent water, i.e. $H_2O$. In still other embodiments the gel-forming composition is at least 85%, and preferably at least about 90 or 91% by weight brine. In another embodiment the amount of the PVA based substance or first substance is from about 0.1 to about 5% of the weight of the gel-forming composition or gel. Preferably the first substance or PVA is from about 0.1 to about 5% of the weight of the gel-forming composition or gel. In still another embodiment the first substance has an average molecular weight of at least about 30,000, preferably at least about 100,000. Preferably the average molecular weight of the first substance or polyvinyl alcohol is from about 100,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000. Preferably the first substance is polyvinyl alcohol. In a preferred embodiment the gel-forming composition is from about 2 to about 3% by weight polyvinyl alcohol and from about 1 to about 2% by weight glutaraldehyde. This composition is useful in treating a well or wellbore having a subterranean temperature at least as high as 80° C.

In a further embodiment, prior to introducing the rapid setting gel-forming composition into the wellbore, a short-term plugging agent is introduced into the wellbore and into the flow passages to temporarily plug the flow passages until a gel is formed in the flow passages from the gel-forming composition. Examples of short-term plugging agents are diatomaceous earth, ground up nut shells, wax beads, and mixtures thereof. In another further embodiment, cement is introduced into the wellbore and from the wellbore into the subterranean formation after introducing the rapid setting gel-forming composition into the wellbore. In another further embodiment, a silicate is introduced into the wellbore and from the wellbore into the subterranean formation after introducing the rapid setting gel-forming composition into the wellbore. Preferably a silicate followed by a cement is introduced into the wellbore after introducing the gel-forming composition into the wellbore.

The above processes are especially useful for reducing the loss of circulation fluids in wells having a severe loss circulation problem. Where the loss circulation occurs in fractures having extremely high permeability, it is desirable to precede the introduction of the gel-forming composition into the wellbore with a temporary plugging agent such as diatomaceous earth, ground up nut shells, wax beads or other substances to initially reduce the permeability in such severe fractures so that the gel-forming composition will have an opportunity to set up and form a gel in such fractures. In general, the gel-forming compositions used for reducing the loss of drilling fluid will be relatively quick setting. This is achieved, for example, by having a relatively high glutaraldehyde concentration in the gel-forming composition with a low pH. The PVA-aldehyde gels as described are stable at high temperatures for long periods of time and offer a definite advantage over many other polymer based gels which are not effective in wells or formations having a high temperature. By having the gel set up in a period of time no greater than about 12 minutes after it is formulated or comes in contact with the formation, this process offer a definite advantage over cements which will not penetrate as deeply into the formation but require a longer time to set up. In some wells having severe fractures the use of cement by itself is ineffective because the cement is lost before it has a chance to set up. In such situations the loss of circulation fluid is only partially corrected. However, in our invention described above, the gel-forming composition sets up rapidly and the loss of circulation fluid is greatly reduced.

There is also provided a gel, which is especially useful for reducing the loss of circulation fluids but is also useful for other purposes which require a rapid setting gel, formed by reacting, in the presence of an effective amount of an acidic catalyst, the components of a gel-forming composition comprising i. a first substance selected from the group consisting of polyvinyl alcohols, polyvinyl alcohol copolymers, and mixtures thereof, ii. an effective amount of a second substance selected from the group consisting of aldehydes, aldehyde generating substances, acetals, acetal generating substances, and mixtures thereof capable of crosslinking with the first substance through the formation of acetal crosslinkages, and iii. water, wherein $H_2O$ provides at least about 62 or 64 percent of the weight of the gel, and wherein the amount of the acidic catalyst in combination with the amount of the second substance is operable for effecting gelation, at a predetermined temperature, of the gel-forming composition in a period of time no greater than about 12 minutes after the gel-forming composition is formed. In one embodiment the total aldehyde content of the gel-forming composition is from about 0.03 to about 10 percent of the weight of the gel-forming composition. Preferably the amount of the acidic catalyst in combination with the amount of second substance or aldehyde is operable for effecting gelation, at a predetermined temperature, of the gel-forming composition in a period of time from about zero or near zero to about 10 minutes after the gel-forming composition is formed.

In one embodiment the amount of second substance or aldehyde is from about 0.03 to about 4% of the weight of the gel-forming composition. In another embodiment the amount of the second substance or aldehyde is at least about 2% of the stoichiometric amount required to react with all the crosslinkable sites of the PVA-based substance or first substance. In a preferred embodiment the aldehyde is glutaraldehyde. In yet another embodiment the amount of the acidic catalyst is sufficient to maintain the pH of the gel-forming composition at a value no greater than about 5.5, or about 5, or about 4. In a further embodiment the pH of the gel-forming composition is at least about 2. In yet another embodiment the amount of the PVA-based substance or first substance is from about 0.1 to about 5% of the gel-forming composition or gel. In still another embodiment the first substance is from about 1.5 to about 5% of the gel-forming composition or gel. In a preferred embodiment the first substance is from about 2 to about 3% of the weight of the gel-forming composition or gel. In another embodiment the first substance has an average molecular weight of at least about 30,000 preferably at least about 100,000. In a further embodiment the average molecular weight of the first substance is from about 100,000 to about 1,000,000. Preferably the average molecular weight of the first substance is about 125,000. In yet another embodiment the first substance is polyvinyl alcohol. In yet another embodiment the water of the gel-forming composition is provided by a brine, and the brine is at least about 85, or 90, or 91 percent of the weight of the gel-forming composition or gel.

Another problem which frequently occurs in enhanced oil recovery operations such as flooding or stimulating is the loss of injected fluids into nonproductive and usually high permeability parts of the reservoir while the productive parts of the reservoir remain largely inaccessible because of their usually low permeability. This invention also provides a combination process in which the high permeability channels which are usually nonproductive are treated to retard the flow of fluids, especially water or brines, while the low permeability zones which are usually oil-bearing are acidized to increase the permeability thereof to the flow of oil or drive or stimulating fluids. Our particular combination of steps provides a relatively easy and effective way to treat reservoirs experiencing both inefficient loss of fluids to nonproductive areas while at the same time improving the recovery from the productive oil-bearing areas of the reservoir.

Accordingly our process provides a method to penetrate the nonproductive high permeability channels for relatively large distances from the wellbore and effectively block the flow of water or brines therein so that better use of the drive or stimulating fluids can be achieved. This is then closely coordinated with an acidizing process to improve flows in desired areas such that as a result of our combination process the efficiency and profitability of the enhanced oil recovery operation is improved. Accordingly, there is also provided a process for retarding the flow of water in high permeability channels in a subterranean formation and increasing the permeability of low permeability oil-bearing porous structure in the subterranean formation comprising introducing into the subterranean formation a predetermined amount of a gel-forming composition which when gelled in the high permeability channels is operable for retarding the flow of water therein, the gel-forming composition comprising (i) an aqueous solution comprising a first substance selected from the group consisting of polyvinyl alcohols, polyvinyl alcohol copolymers, and mixtures thereof, and (ii) an effective amount of a second substance selected from the group consisting of aldehydes, aldehyde generating substances, acetals, acetal generating substances, and mixtures thereof capable of crosslinking with the first substance through the formation of aceral crosslinkages, wherein the total aldehyde content of the gel-forming composition is from about 0.1 to about 5 percent of the weight of the gel-forming composition, sufficient to form a gel with said aqueous solution, when in the presence of an effective amount of a crosslinking catalyzing substance; and allowing the gel-forming composition to form a gel, in the presence of an effective amount of the crosslinking catalyzing substance, in the high permeability channels which is effective for retarding the flow of water therein; after introducing the gel-forming composition into the high permeability channels, introducing into the subterranean formation a predetermined amount of an acidizing substance which is operable for penetrating the low permeability porous structure and dissolving flow inhibiting deposits therein; and allowing the acidizing substance to dissolve the flow inhibiting deposits thereby increasing the permeability of the low permeability porous structure. In one embodiment of our combination process the acidizing substance is introduced into the subterranean formation within a period of time from about zero to about one day after the gel is formed in the high permeability channels. In another embodiment the acidizing substance is introduced into the subterranean formation after the gel is formed in the high permeability channels. In a further embodiment the acidizing substance is introduced into the subterranean formation within a period of time from about zero to about 10 hours after the gel is formed in the high permeability channels. In another embodiment after introducing into the subterranean formation the predetermined amount of the gel-forming composition, an effective amount of a crosslinking catalyzing substance is introduced into the subterranean formation which is operable to cause the gel-forming composition in the high permeability channels to gel therein. In yet another embodiment the crosslinking catalyzing substance and the acidizing substance have the same composition.

In a further embodiment of our combination process the amount of second substance or aldehyde is from about 0.005 or about 0.01 to about 4% or about 5% of the weight of the gel-forming composition. In another embodiment the amount of second substance or aldehyde is at least 0.7% of the stoichiometric amount required to react with all of the crosslinkable sites of the first substance. In a preferred embodiment the aldehyde is glutaraldehyde. In yet another embodiment the PVA-based substance or first substance is from about 0.1 to about 5% of the weight of the gel-forming mixture or gel. In still another embodiment the first substance is from about 1.5 to about 5% of the gel-forming composition or gel. In another embodiment the first substance has an average molecular weight of at least 30,000, and preferably at least 100,000. Preferably the average molecular weight of the first substance or polyvinyl alcohol is from about 100,000 to about 1,000,000. Higher molecular weights can be used; however, the higher the molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000. In yet another embodiment, the first substance is polyvinyl alcohol. In another embodiment the gel-forming composition is at least about 64% by weight fresh water or $H_2O$. In another embodiment the water of the gel-forming composition is provided by a brine, and the brine is at least about 90 or 91 percent of the weight of the gel-forming composition or gel. In one embodiment the first substance or polyvinyl alcohol is from about 2 to about 3 of the weight of the gel-forming composition or gel. In a preferred embodiment the gel-forming composition or gel is about 2.5% by weight polyvinyl alcohol and about 0.1% by weight glutaraldehyde. These gel-forming compositions are particularly useful in subterranean formations having a formation temperature at least as high as about 65° C.

In another embodiment of our combined process, the aldehyde is glutaraldehyde and the amount of glutaraldehyde is operable for promoting crosslinking of the first substance and glutaraldehyde under weakly acidic conditions and a separately provided acidic catalyst is not required. In a further embodiment, other than glutaraldehyde and acidic products produced in the gel-forming composition from the glutaraldehyde, the gel-forming composition is substantially free of effective amounts of crosslinking catalyzing substances which are operable for promoting substantial acidic catalysis of a crosslinking reaction between the first substance and glutaraldehyde; and wherein the gel is formed in the subterranean formation without the necessity of contacting the gel-forming composition with any additional effective amounts of a crosslinking catalyzing substance. This particular gel-forming composition and method of forming is more fully described in our copending Ser. No. 624,111 filed on June 25, 1984.

In a further embodiment of our combined process further comprises, after forming the gel in the high permeability channels and dissolving the flow inhibiting deposits in the low permeability porous structure, recovering oil from the subterranean formation. In a further embodiment oil is recovered by water flooding.

In a preferred embodiment of our combination process the crosslinking catalyzing substance is a delayed action catalyst such as an ester which slowly hydrolyzes as it moves away from the wellbore into the formation. The ester is selected so that it will slowly form a weak organic acid as it penetrates into the formation. In this embodiment the weak organic acid also reacts with the flow inhibiting deposits in the low permeability channels. The combination of selecting the crosslinking catalyzing substance which allows the gel-forming composition to slowly gel thereby enabling in-depth plugging of the high permeability channels, and which also allows in-depth acidizing of the low permeability channels, is a particularly useful combination. This embodiment has the advantage over many prior art processes in that only two compositions are involved; namely, the gel-forming composition and the crosslinking catalyzing substance which also serves as the acidizing substance. These two substances can be initially premixed, or simultaneously injected, or injected in alternate slugs, into the formation. If separately but simultaneously injected, after the high permeability zones are plugged, the injection of the gel-forming composition is terminated while injection of the acidizing substance is continued. The advantage of not having several different formulations to pump into the well or to premix at various times greatly facilitates the use of this method for enhanced oil recovery. Having only two compositions for injection also reduces the chances for operating error. The method is particularly valuable in remote locations where providing several compositions and several storage tanks would be difficult. For example, jungle locations or other remote locations are very difficult to operate in because the general lack of utilities renders complex processes susceptible to prolonged down times for relatively minor break downs. Thus there is a need for a relatively simple method of enhancing oil recovery.

Whether these inventions are used for preventing loss of circulation fluids as first described herein, or for a combination process as subsequently described herein, in all of these embodiments there is the additional advantages of being able to use the formation brine as a source of water for the injected mixtures, and the stability of the gels at elevated temperatures. In still further embodiments of the above described gels, the water used to form the gel has a hardness of at least about 1000 ppm. In further embodiments the water has a hardness of at least about 3000 ppm, or 6000 ppm, or higher. In other further embodiments of the above described gels, the water used to form the gel has a total dissolved solids content of at least about 30,000 ppm. In a still further embodiment such water has a total dissolved solids content of at least about 80,000 ppm or more and can be a saturated brine.

In the embodiments of this invention the various crosslinkable aldehydes and glutaraldehyde crosslink with the polyvinyl alcohol or polyvinyl alcohol copolymer through formation of acetals. It has been found that gels formed in this way are adaptable to the hardness of the water from which they are formed or exposed. These gels are also more stable at high temperatures than polyacrylamide based gels or gels made from biopolymers or polyvinyl alcohols gelled by other crosslinking agents such as borate.

Because of the adaptability and compatibility of these gels to water hardness or total dissolved solids content, these gels can be prepared using formation water, brackish water, sea water, brine or usually any other available source of water conveniently at hand as well as fresh water, i.e. $H_2O$. Because the largest ingredient used to formulate the above described gels is principally water, substantial economic advantage is provided by this invention which permits gels to be formed with the cheapest source of available water. However, the advantages of these inventions are not limited merely to economic advantages because these gels also provide substantial technical advantages over other gels. For example, in many of their uses these gels are subjected to the infusion of severely contaminated water into the gelling mass prior to reaching its gelation point. Where such contaminated water infusion occurs in many other gelling fluids the gelation thereof is destroyed or so severely harmed that such other gels, if in fact they do gel, would be rendered ineffective for their intended use.

Due to their stability at elevated temperatures, the above described gels can also be formed and used in formations having an average in-situ or formation temperature of about 80° C. or higher, and in some embodiments where the average in-situ or formation temperature is 125° C. or higher.

The above described methods of forming a gel in situ in subterranean formations be be practices using all of the gels provided by this invention.

With regard to our combination process for enhanced oil recovery, the principles of this invention can be used where the subterranean water-conveying zone or flow channel, or nonproductive or high permeability part of a reservoir is under the subterranean hydrocarbon-producing formation; or where the subterranean water-conveying zone surrounds the subterranean hydrocarbon-producing formation; or where at least part of the subterranean water-conveying zone coincides with at least part of the subterranean hydrocarbon-producing formation.

In one embodiment of this invention directed to a water flood operations, it frequently is desirable to treat the water injector wells with a polymer gel-forming solution to control the water flow profile. In this embodiment such treatment prevents channeling of water at the injector well and/or controls and/or redirects water flow through regions of varying permeability. Since in this embodiment the polymer is injected as a relatively low viscosity aqueous phase it penetrates preferentially the region of highest permeability to water. Accordingly, after formation of the gel in high permeability regions, such regions are converted to low permeability to further retard water flow thereby causing, upon further water injection, a water sweep of previously inaccessible areas in the formation which usually have relatively low permeability. By extending the water flow to such previously inaccessible regions, more hydrocarbons can be recovered than would be recovered in the absence of such polymer treatment.

The gels of these inventions have improved resistance to heat and are stable in hard water. These characteristics make these gels particularly useful for many oil field applications such as water mobility control. These gels can be advantageously used in other harsh environments such as solar pond construction where they can be used to consolidate loose soil and to retard or stop the leakage of brine through the pond floor, or to prevent convective flow from lower intervals containing hotter water into upper intervals containing cooler water. For oil field application, no other gels are known which exhibit the stability and durability of the gels of this invention especially in high temperature reservoirs.

Accordingly, one objective of this invention is to provide a means of controlling water movement in oil wells and subterranean formations especially in formations having temperatures 80° C. or higher, or where the waters involved are saline or hard.

Still another object of this invention is to provide a gel which can be formulated using hard water and water containing a high level of dissolved solids such as sea water and formation water encountered in deep off-shore hydrocarbon fields.

Another object of this invention is to provide a gel which is quick setting so that it can be used to stop the loss of circulating fluids such as drilling, completion and workover fluids.

Another object of this invention is to provide a gel which is stable at high temperatures and in particular more stable than other gels at such high temperatures.

DESCRIPTION OF THE PREFERRED EMBODIMENTS

In one embodiment the gel-forming mixture is first formed at or near the point of lost circulation in the wellbore by injecting one of the components of the gel-forming mixture separately into the formation adjacent or near the point of lost circulation. For example, the acidic catalyst by itself or mixed with the aldehyde, or the aldehyde by itself can be injected into the formation through a separate tubing run down the wellbore adjacent to, or near, the point of lost circulation. The aqueous solution of PVA based substance can be introduced directly into the wellbore or in another separate tubing the outlet of which is adjacent to the point of loss circulation. The two separate streams meet and mix for the first time adjacent to, or near, the point of lost circulation. In the fast setting gel-forming composition of this invention isolation of any one of the three components, i.e., aldehyde, acidic catalyst, or PVA based substance, from the other two components will prevent the initiation of the crosslinking and hence gelation reaction.

EXAMPLE NO. 1

This example demonstrates how to determine the relationship between the aldehyde concentration and the pH of the gel-forming composition and the gel time thereof in a particular reservoir rock associated with a well experiencing a loss of circulation fluid. Reservoir injection water (RIW) or reservoir brine is preferably used to produce the gel-forming composition. Polyvinyl alcohol having an average molecular weight of about 125,000 is added to RIW to produce a 3% concentration and the mixture heated to 95° C. for 45 minutes to completely dissolve the polymer. The pH of the mixture is adjusted to 5.0 by the addition of 12% HCl solution.

A high pressure core holder is packed with crushed reservoir rock to form a 60 centimeters (60 cm) long, 5 cm diameter test core sample. The test core sample is saturated with RIW and heated to 90° C. in preparation for a flow test. RIW, at 90° C., is injected into the core sample at a rate of 30 cm per day and the pressure drop across the core sample measured. Mineral oil, at 90° C., having a viscosity of 10 centipoise (10 cp) at 25° C., is then pumped through the core sample at 30 cm per day until no more RIW is displaced therefrom. Additional RIW, at 90° C., is then pumped through the core sample at 30 cm per day until no more mineral oil is displaced therefrom and the pressure drop measured.

The gel-forming composition is prepared by mixing 24 parts of the thusly prepared 3% polymer solution with one part by weight of a 50% aqueous glutaraldehyde solution (commercial grade) in a mixing tee located at the inlet of the high pressure core holders. The gel-forming composition is thereafter injected into the core sample immediately after its formation. The injection rate is 30 cm per day until the gel point is reached which is indicated by a rapid increase in pressure. The actual gel time is compared to the nominal gel time in neutral rock. The variation of gel-time from nominal is an indication of the influence of the reservoir rock on crosslinking reaction rates.

EXAMPLE NO. 2

Preferably after determining the effective aldehyde concentration and pH of the gel-forming composition in core samples of crushed reservoir rock, for example as described in Example No. 1, treatment of a well experiencing a loss of circulation fluid can be conducted with a gel-forming composition which is effective for stopping the loss of circulation fluid. For example, in a well having a temperature of about 90° C. and experiencing a loss of circulation fluid to a 30 cm interval at the 2700 meter (2700 m) depth, the end of the drill pipe is set adjacent the 30 cm interval at the 2700 m depth. Separate tubing is also set opposite the 30 cm interval.

A 3% polyvinyl alcohol RIW mixture having its pH adjusted to 5.0 is injected into the wellbore at a rate of about 20 cubic meters per hour (20 CMPH) until 160 cubic meters is injected. Simultaneously with the injection of the polymer mixture, a 50% aqueous glutaraldehyde solution (commercial grade) is injected into the separate tubing at a rate which corresponds to the effective glutaraldehyde concentrate determined in a core sample of crushed reservoir rock, or alternatively at a predetermined rate which corresponds to a predetermined ratio of glutaraldehyde to polyvinyl alcohol. For example the glutaraldehyde can be injected at a rate of about 0.83 CMPH.

If after injection of 80 cubic meters of the gel-forming composition the pressure has not increased substantially, then to the remaining 80 cubic meters of polymer mixture, is added about 0.04 cubic meters of a bridging agent. Nonlimiting examples of bridging agents are diatomaceous earth, wax beads, crushed walnut shells, and other plugging agents.

At any point in the plugging operation, when the injection pressure increases rapidly indicating that plugging of the 30 cm interval has been completed, the injection of gel-forming aqueous solutions into the formation is stopped and the gel-forming mixture is displaced into the formation with no more than about 0.5 cubic meters of brine of over displacement.

The gel-forming composition is formulated so that it will gel within 5 minutes after entering the lost circulation interval. The first part of the formed gel is pushed away from the wellbore in-depth into the interval. This process is repeated with subsequently formed gel segments until sufficient gel is formed in the entire interval and the injection pressures for the aqueous mixtures increase rapidly. Even though the mixture is designed to gel rapidly, several hours of injection will probably be required in order to inject all of the mixtures necessary to completely plug the interval. In most cases, about 80 to 160 cubic meters of gel-forming composition is required. After plugging the lost circulation interval, the drilling operation can be resumed.

EXAMPLE NO. 3

This example demonstrates how to determine the relationship between the gel-forming composition and the pH and gel-time thereof in a particular reservoir rock associated with a well experiencing water channeling in a water flood operation. Reservoir injection water (RIW) or reservoir brine is preferably used to produce the gel-forming composition. Polyvinyl alcohol having an average molecular weight of about 125,000 is added to RIW to produce a 2.5% concentration and the mixture heated to 95° C. for 45 minutes to completely dissolve the polymer.

A reservoir test core sample 60 centimeters (60 cm) long, and 0.8 cm in diameter is wrapped with Teflon TM tape and saturated with RIW. A 0.4 cm hole is drilled in the core along its axis thereby producing an annular core sample of reservoir rock. A porous distribution disk is sealed to one end of the annular core sample with Teflon TM tape. The central cylindrical cavity of the annular core sample is then packed with crushed reservoir rock and packed annular core sample with attached distribution disk is inserted into a tightly fitted heat shrinkable Teflon TM tube and the tube sealed. The packed central column represents a zone of high permeability and the annular core a zone of low permeability. The core unit is then mounted in an overburden cell, saturated by RIW and heated to 90° C. in preparation for a flow test. RIW, at 90° C., is injected into the core sample at a rate of 30 cm per day and the pressure drop across the core sample measured. Mineral oil, at 90° C., having a viscosity of 10 centipoise (10 cp) at 25° C., is then pumped through the core sample at 30 cm per day until no more RIW is displaced therefrom. Additional RIW, at 90° C., is then pumped through the core sample at 30 cm per day until no more mineral oil is displaced therefrom and the pressure drop measured.

The gel-forming composition is prepared by mixing 99 parts of the thusly prepared 2.5% polymer solution with one part by weight of a 50% aqueous glutaraldehyde solution (commercial grade) and the pH adjusted to 4.0. by the addition of 12% of HCl solution. Preferably the amount of glutaraldehyde and the pH of the composition is designed to gel in about 3 hours.

The thusly formed gel-forming composition, at 90° C., is then injected into the packed core sample at a rate of 150 cm per day until the gel point is reached which is indicated by a rapid increase in pressure drop across the core sample. At this point the packed column of crushed reservoir rock has been plugged while the annular core sample has not. RIW, at 90° C., is injected into the core sample at a rate of 30 cm per day and the pressure drop measured. The ratio of the pressure drops across the core sample before treatment with the gel-forming composition and after treatment and gelation is an indication of the effectiveness of the plugging procedure. Accordingly, the higher such ratios are more effective in the plugging operation.

The low permeability of the annular core sample is now increased by injecting a 3% HCl aqueous solution into the core sample at a steady flow rate until a significant decrease in pressure drop occurs. RIW, at 90° C., is then injected at a rate of 30 cm per day and the pressure drop again measured. The effectiveness of the acidizing step is indicated by the reduction in pressure drop across the sample.

EXAMPLE NO. 4

Preferably after determining the effective gel-forming composition and pH thereof in core samples as described in Example No. 3, treatment of a reservoir experiencing water channeling in waterflooding can be conducted with a gel-forming composition which is effective for reducing water flow in high permeability channels. The reservoir has a temperature of 90° C., an average permeability of 200 millidarcies (200 md) and a porosity of 20%, and before treatment is experiencing a RIW injection rate of 32 cubic meters per day (32 CMPD) at an injection surface pressure of 70 kilograms per square centimeter gauge (70 kscmg) or 1000 psig. Before treatment, approximately 50% of the RIW is entering the bottom 25 cm of a 470 cm interval, 75% of the bottom 50 cm of the interval, and about 100% of the bottom 100 cm of the interval.

A 2.5% polyvinyl alcohol aqueous solution, formulated as in Example No. 3, is heated to 95° C. in an in-line heater and stored in an insulated tank for at least 45 minutes to completely dissolve the polymer. The gel-forming composition is prepared as in Example No. 3 by mixing 99 parts of the polymer solution with one part by weight of a 50% aqueous glutaraldehyde solution and the pH adjusted to 4.0. About 100 cubic meters of the gel-forming mixture is injected into the injection well at a steady rate over a period of three days. The gel-forming composition is then displaced into the reservoir preferably with no more than about one cubic meter of RIW over displacement. The well is then shut in for about two days which is then followed by acidizing. Acidizing is accomplished by injecting 7.6 cubic meters or 2000 gallons of 3% HCl solution. The acidizing solution is followed by resumption of the waterflood operation.

It is expected that the combined process of retarding water flow in the high permeability channels with the gel-forming composition and increasing the permeability of the low permeable channels with the subsequent acidizing step will reduce the injection surface pressure to about 35 kscmg, increase the RIW injection rate to about 160 cubic meters per day, and provide an improved injection profile in the 470 cm interval such that about 10% of the RIW enter the bottom 25 cm of the interval, 20% the bottom 50 cm, 25% the bottom 100 cm, 50% the bottom 200 cm, and 100% the total interval.

Unless otherwise specified herein, all percents are weight percents.

The gels, the methods of forming the gels, and the processes for preventing loss circulation and retarding the flow of fluids have some degree of flexibility. For example, if the environment in which the gels are to be used has a relatively high temperature, gel time can be slowed by using a smaller amount of acidic catalyst and aldehyde. Similarly, if the environmental temperature is relatively low, gelation can be speeded by the use of larger amounts of acidic catalyst and aldehyde. It is permissible to use the formation brine of the subterranean zone as the water part of the gel-forming composition since the gel will form even with hard water or saturated brine. Other variations of formulations, methods and processes will be apparent from this invention to those skilled in the art.

The foregoing disclosure and description of the present invention is illustrative and explanatory thereof and various changes in gel formation procedures and gel composition as well as the uses and applications of such gels to form them in situ in subterranean formations and to retard or block fluids in subterranean formations may be made within the scope of the appending claims without departing from the spirit of the invention. For example, many gel formulations can be produced and many methods of forming such gels in situ in subterranean deposits will be apparent to one skilled in the art from this invention. For example, the necessary concentrations, amounts and sequence of injection of the gel forming fluids can be tailored to suit the particular well or subterranean formation being treated.

What is claimed is:

1. A process for reducing the loss of circulation fluids into flow passages of a subterranean formation during well drilling, completion, or workover operations, said circulation fluids being selected from the group consisting of drilling fluids, completion fluids and workover fluids, ssid process comprising:
    (a) stopping the injection of a circulation fluid selected from the group consisting of drilling fluids, completion fluids and workover fluids into a wellbore;
    (b) introducing into said flow passages, an effective amount of a gel-forming composition comprising
        i. an aqueous solution comprising a first substance selected from the group consisting of polyvinyl alcohols, polyvinyl alcohol copolymers, and mixtures thereof,
        ii. an amount of an aldehyde, and
        iii. an amount of a crosslinking catalyzing substance, which in combination with said aqueous solution and said aldehyde is operable for effecting gelation, at the temperature of said subterranean formation, of said gel-forming composition in a period of time no greater than about 12 minutes after being introduced into said subterranean formation; and
    (c) allowing said gel-forming composition to enter into said flow passages and to form a gel therein within said period of time mentioned in step (b), thereby reducing the loss of said circulation fluid upon resuming well drilling, completion or workover operation.

2. A process for reducing the loss of circulation fluids into flow passages of a subterranean formation during well drilling, completion or workover operations, said circulation fluids being selected from the group consisting of drilling fluids, completion fluids and workover fluids, said process comprising:
    (a) stopping the injection of a circulation fluid selected from the group consisting of drilling fluids, completion fluids and workover fluids into a wellbore;
    (b) introducing into said wellbore, and from said wellbore into said flow passages, an effective amount of a gel-forming composition comprising
        i. an aqueous solution of a first substance selected from the group consisting of polyvinyl alcohols, polyvinyl alcohol copolymers and mixtures thereof, wherein said first substance is from about 0.1 to about 5% of the weight of said gel-forming composition,
        ii. an amount of a second substance selected from the group consisting of aldehydes, aldehyde generating substances, acetals, acetal generating substances, and mixtures thereof capable of crosslinking with said first substance through the formation of acetal crosslinkages, wherein total aldegyde content of said gel-forming composition is from about 0.03 to about 10% of the weight of said gel-forming composition, and
        iii. an amount of a crosslinking catalyzing substance, which in combination with said aqueous solution and second substance, is operable for effecting gelation, at the temperature of said subterranean formation, of said gel-forming composition in a period of time no greater than about 12 minutes after being introduced into said subterranean formation, wherein the pH of said gel-forming composition is no greater than about 5.5; and
    (c) allowing said gel-forming composition to enter into said flow passages and to form a gel therein within said period of time mentioned in step (b), thereby reducting the loss of said circulation fluid upon resuming well drilling, completion or workover operation.

3. A process for reducing the loss of circulation fluids into flow passages of a subterranean formation during well drilling, completion or workover operations, said circulation fluids being selected from the group consisting of drilling fluids, completion fluids and workover fluids, said process comprising:
    (a) stopping the injection of a circulation fluid selected from the group consisting of drilling fluids, completion fluids and workover fluids into a wellbore;
    (b) introducing into said wellbore, and from said wellbore into said flow passages, an effective amount of a gel-forming composition comprising
        i. an aqueous solution of a first substance selected from the group consisting of polyvinyl alcohols, polyvinyl alcohol copolymers, and mixtures thereof, wherein said first substance is from about 0.1 to about 5% of the weight of said gel-forming composition,
ii. an amount of a second substance selected from the group consisting of aldehydes, aldehyde generating substances, acetals, acetal generating substances, and mixtures thereof capable of crosslinking with said first substance through the formation of acetal crosslinkages wherein total aldehyde content of said gel-forming composition is from about 0.03 to about 10% of said gel-forming composition, and
iii. an amount of a crosslinking catalyzing substance, which in combination with said aqueous solution and second substance, is operable for effecting gelation, at the temperature of said subterranean formation, of said gel-forming composition in a period of time no greater than about 12 minutes after being introduced into said subterranean formation, wherein the pH of said gel-forming composition is no greater than about 5.5, and wherein said gel-forming composition is at least about 60 weight percent $H_2O$; and
(c) allowing said gel-forming composition to enter into said flow passages and to form a gel therein within said period of time mentioned in step (b), thereby reducing the loss of said circulation fluid upon resuming well drilling, completion or workover operation.

4. A process for reducing the loss of circulation fluids into flow passages of a subterranean formation during well drilling, completion or workover operations, said circulation fluids being selected from the group consisting of drilling fluids, completion fluids and workover fluids, said process comprising:
(a) stopping the injection of a circulation fluid selected from the group consisting of drilling fluids, completion fluids and workover fluids into a wellbore;
(b) introducing into said wellbore, and from said wellbore into said flow passages, an effective amount of a gel-forming composition comprising
i. an aqueous solution of a first substance selected from the group consisting of polyvinyl alcohols, polyvinyl alcohol copolymers, and mixtures thereof, wherein said first substance is from about 0.1 to about 5% of the weight of said gel-forming composition,
ii. an amount of a second substance selected from the group consisting of aldehydes, aldehyde generating substances, acetals, acetal generating substances, and mixtures thereof capable of crosslinking with said first substance through the formation of acetal crosslinkages, wherein total aldehyde content of said gel-forming composition is from about 0.03 to about 10% of the weight of said gel-forming composition, and
iii. an amount of a crosslinking catalyzing substance, which in combination with said aqueous solution and second substance, is operable for effecting gelation, at the temperature of said subterranean formation, of said gel-forming composition in a period of time no greater than about 12 minutes after being introduced into said subterranean formation, wherein the pH of said gel-forming composition is no greater than about 5.5, and wherein said gel-forming composition is at least about 85 weight percent brine; and
(c) allowing said gel-forming composition to enter into said flow passages and to form a gel therein within said period of time mentioned in step (b), thereby reducing the loss of said circulation fluid upon resuming well drilling, completion or workover operation.

5. A process for reducing the loss of circulation fluids into flow passages of a subterranean formation during well drilling, completion or workover operations, said circulation fluids being selected from the group consisting of drilling fluids, completion fluids and workover fluids, said process comprising:
(a) stopping the injection of a circulation fluid selected from the group consisting of drilling fluids, completion fluids and workover fluids into a wellbore;
(b) introducing into said wellbore, and from said wellbore into said flow passages, an effective amount of a gel-forming composition comprising
i. an aqueous solution of a first substance selected from the group consisting of polyvinyl alcohols, polyvinyl alcohol copolymers, and mixtures thereof, said first substance having an average molecular weight of at least 30,000, wherein said first substance is from about 1.5 to about 5% of the weight of said gel-forming composition,
ii. an amount of a second substance selected from the group consisting of aldehydes, aldehyde generating substances, acetals, acetal generating substances, and mixtures thereof capable of crosslinking with said first substance through the formation of acetal crosslinkages, wherein total aldehyde content of said gel-forming composition is from about 0.03 to about 4 percent of the weight of said gel-forming composition, and
iii. an amount of a crosslinking catalyzing substance, which in combination with said aqueous solution and second substance, is operable for effecting gelation, at the temperature of said subterranean formation, of said gel-forming composition in a period of time no greater than about 12 minutes after being introduced into said subterranean formation, wherein the pH of said gel-forming composition is no greater than about 5.5; and
(c) allowing said gel-forming composition to enter into said flow passages and to form a gel therein within said period of time mentioned in step (b), thereby reducing the loss of said circulation fluid upon resuming well drilling, completion or workover operation.

6. A process for reducing the loss of circulation fluids into flow passages of a subterranean formation during well drilling, completion or workover operations, said circulation fluids being selected from the group consisting of drilling fluids, completion fluids and workover fluids, said process comprising:
(a) stopping the injection of a circulation fluid selected from the group consisting of drilling fluids, completion fluids and workover fluids into a wellbore;
(b) introducing into said wellbore, and from said wellbore into said flow passages, an effective amount of a gel-forming composition comprising
i. an aqueous solution of a first substance selected from the group consisting of polyvinyl alcohols, polyvinyl alcohol copolymers, and mixtures thereof, said first substance having an average molecular weight of at least 30,000, wherein said first substance is from about 1.5 to about 5% of the weight of said gel-forming composition, ii. an amount of a second substance selected from the group consisting of aldehydes, aldehyde generating substances, acetals, acetal generating substances, and mixtures thereof capable of crosslinking with said first substance through the formation of acetal crosslinkages, wherein total aldehyde content of said gel-forming composition is from about 0.03 to about 4 percent of the weight of said gel-forming composition, and iii. an amount of a crosslinking catalyzing substance, which in combination with said aqueous solution and second substance, is operable for effecting gelation, at the temperature of said subterreanean formation, of said gel-forming composition in a period of time no greater than about 12 minutes after being introduced into said subterranean formation, wherein the pH of said gel-forming composition is no greater than about 5.5, and wherein said gel-forming composition is at least about 64 weight percent $H_2O$; and (c) allowing said gel-forming composition to enter into said flow passages and to form a gel therein within said period of time mentioned in step (b), thereby reducing the loss of said circulation fluid upon resuming well drilling, completion or workover operation.

7. A process for reducing the loss of circulation fluids into flow passages of a subterranean formation during well drilling, completion or workover operations, said circulation fluids being selected from the group consisting of drilling fluids, completion fluids and workover fluids, said process comprising:

(a) stopping the injection of a circulation fluid selected from the group consisting of drilling fluids, completion fluids and workover fluids into a wellbore;

(b) introducing into said wellbore, and from said wellbore into said flow passages, an effective amount of a gel-forming composition comprising i. an aqueous solution of a first substance selected from the group consisting of polyvinyl alcohols, polyvinyl alcohol copolymers, and mixtures thereof, said first substance having an average molecular weight of at least 30,000, wherein said first substance is from about 1.5 to about 5% of the weight of said gel-forming composition, ii. an amount of a second substance selected from the group consisting of aldehydes, aldehyde generating substances, acetals, acetal generating substances, and mixtures thereof capable of crosslinking with said first substance through the formation of acetal crosslinkages, wherein total aldehyde content of said gel-forming composition is from about 0.03 to about 4 percent of the weight of said gel-forming composition, and iii. an amount of a crosslinking catalyzing substance, which in combination with said aqueous solution and second substance, is operable for effecting gelation, at the temperature of said subterranean formation, of said gel-forming composition in a period of time no greater than about 12 minutes after being introduced into said subterranean formation, wherein the pH of said gel-forming composition is no greater than about 5.5, and wherein said gel-forming composition is at least about 91 weight percent brine; and (c) allowing said gel-forming composition to enter into said flow passages and to form a gel therein within said period of time mentioned in step (b), thereby reducing the loss of said circulation fluid upon resuming well drilling, completion or workover operation.

8. The process of claim 1, wherein said first substance has an average molecular weight of at least 100,000.

9. The process of claim 2, wherein said amount of said second substance is at least about 2% of the stoichiometric amount required to react with all of the crosslinkable sites of said first substance.

10. The process of claim 2, wherein said amounts of said crosslinking catalyzing substance and said second substance are operable for effecting gelation, at the temperature of said subterranean formation, of said gel-forming composition in a period of time from about zero to about 10 minutes after being introduced into said subterranean formation.

11. A process for reducing the loss of circulation fluids into flow passages of a subterranean formation during well drilling, completion or workover operations, said circulation fluids being selected from the group consisting of drilling fluids, completion fluids and workover fluids, said process comprising:

(a) stopping the injection of a circulation fluid selected from the group consisting of drilling fluids, completion fluids and workover fluids into a wellbore;

(b) introducing into said wellbore, and from said wellbore into said flow passages, an effective amount of a gel-forming composition comprising i. an aqueous solution of polyvinyl alcohol, wherein said polyvinyl alcohol is from about 0.1 to about 5% of the weight of said gel-forming composition, ii. an amount of glutaraldehyde from about 0.03 to about 10 percent of the weight of said gel-forming composition, and iii. an amount of a crosslinking catalyzing substance, which in combination with said aqueous solution and glutaraldyhyde, is operable for effecting gelation, at the temperature of said subterranean formation, of said gel-forming composition in a period of time from about one second to no greater than about 12 minutes after being introduced into said subterranean formation, wherein the pH of said gel-forming composition is no greater than about 5.5; and (c) allowing said gel-forming composition to enter into said flow passages and to form a gel therein within said period of time mentioned in step (b), thereby reducing the loss of said circulation fluid upon resuming well drilling, completion or workover operation.

12. A process for reducing the loss of circulation fluids into flow passages of a subterranean formation during well drilling, completion or workover operations, said circulation fluids being selected from the group consisting of drilling fluids, completion fluids and workover fluids, said process comprising:

(a) stopping the injection of a circulation fluid selected from the group consisting of drilling fluids, completion fluids and workover fluids into a wellbore;

(b) introducing into said wellbore, and from said wellbore into said flow passages, an effective amount of a gel-forming composition comprising
   i. an aqueous solution of polyvinyl alcohol, wherein said polyvinyl alcohol is from ubout 0.1 to about 5% of the weight of said gel-forming composition,
   ii. an amount of glutaraldehyde from about 0.03 to about 10 percent of the weight of said gel-forming composition, and
   iii. an amount of a crosslinking catalyzing substance, which in combination with said aqueous solution and glutaraldehyde, is operable for effecting gelation, at the temperature of said subterranean formation, of said gel-forming composition in a period of time from about one second to no greater than about 12 minutes after being introduced into said subterranean formation, wherein the pH of said gel-forming composition is no greater than about 5.5, and wherein said gel-forming composition is at least about 60 weight percent $H_2O$; and
(c) allowing said gel-forming composition to enter into said flow passages and to form a gel therein within said period of time mentioned in step (b), thereby reducing the loss of said circulation fluid upon resuming well drilling, completion or workover operation.

13. A process for reducing the loss of circulation fluids into flow passages of a subterranean formation during well drilling, completion or workover operations, said circulation fluids being selected from the group consisting of drilling fluids, completion fluids and workover fluids, said process comprising:
   (a) stopping the injection of a circulation fluid selected from the group consisting of drilling fluids, completion fluids and workover fluids into a wellbore;
   (b) introducing into said wellbore, and from said wellbore into said flow passages, an effective amount of a gel-forming composition comprising
      i. an aqueous solution of polyvinyl alcohol wherein said polyvinyl alcohol is from about 0.1 to about 5% of the weight of said gel-forming composition,
      ii. an amount of glutaraldehyde from about 0.03 to about 10 percent of the weight of said gel-forming composition, and
      iii. an amount of a crosslinking catalyzing substance, which in combination with said aqueous solution and glutaraldehyde, is operable for effecting gelation, at the temperature of said subterranean formation, of said gel-forming composition in a period of time from about one second to no greater than about 12 minutes after being introduced into said subterranean formation, wherein the pH of said gel-forming composition is no greater than about 5.5, and wherein said gel-forming composition is at least about 85 weight percent brine; and
   (c) allowing said gel-forming composition to enter into said flow passages and to form a gel therein within said period of time mentioned in step (b), thereby reducing the loss of said circulation fluid upon resuming well drilling, completion or workover operation.

14. A process for reducing the loss of circulation fluids into flow passages of a subterranean formation during well drilling, completion or workover operations, said circulation fluids being selected from the group consisting of drilling fluids, completion fluids and workover fluids, said process comprising:
   (a) stopping the injection of a circulation fluid selected from the group consisting of drilling fluids, completion fluids and workover fluids into a wellbore;
   (b) introducing into said wellbore, and from said wellbore into said flow passages, an effeotive amount of a gel-forming composition comprising
      i. an aqueous solution of polyvinyl alcohol having an average molecular weight of at least 30,000, wherein said polyvinyl alcohol is from about 1.5 to about 5% of the weight of said gel-forming composition,
      ii. an amount of glutaraldehyde from about 0.03 to about 4 percent of the weight of said gel-forming composition, and
      iii. an amount of a crosslinking catalyzing substance, which in combination with said aqueous solution and glutaraldehyde, is operable for effecting gelation, at the temperature of said subterranean formation, of said gel-forming composition in a period of time from about one second to no greater than about 12 minutes after being introduced into said subterranean formation, wherein the pH of said gel-forming composition is no greater than about 5.5; and
   (c) allowing said gel-forming composition to enter into said flow passages and to form a gel therein within said period of time mentioned in step (b), thereby reducing the loss of said circulation fluid upon resuming well drilling, completion or workover operation.

15. A process for reducing the loss of circulation fluids into flow passages of a subterranean formation during well drilling, completion or workover operations, said circulation fluids being selected from the group consisting of drilling fluids, completion fluids and workover fluids, said process comprising:
   (a) stopping the injection of a circulation fluid selected from the group consisting of drilling fluids, completion fluids and workover fluids into a wellbore;
   (b) introducing into said wellbore, and from said wellbore into said flow passages, an effective amount of a gel-forming composition comprising
      i. an aqueous solution of polyvinyl alcohol having an average molecular weight of at least 30,000, wherein said polyvinyl alcohol is from about 1.5 to about 5% of the weight of said gel-forming composition,
      ii. an amount of glutaraldehyde from about 0.03 to about 4 percent of the weight of said gel-forming composition, and
      iii. an amount of a crosslinking catalyzing substance, which in combination with said aqueous solution and glutaraldehyde, is operable for effecting gelation, at the temperature of said subterranean formation, of said gel-forming composition in a period of time from about one second to no greater than about 12 minutes after being introduced into said subterranean formation, wherein the pH of said gel-forming composition is no greater than about 5.5, and wherein said gel-forming composition is at least about 64 weight percent $H_2O$; and (c) allowing said gel-forming composition to enter into said flow passages and to form a gel therein within said period of time mentioned in step (b), thereby reducing the loss of said circulation fluid upon resuming well drilling, completion or workover operation.

16. A process for reducing the loss of circulation fluids into flow passages of a subterranean formation during well drilling, completion or workover operations, said circulation fluids being selected from the group consisting of drilling fluids, completion fluids and workover fluids, said process comprising:
   (a) stopping the injection of a circulation fluid selected from the group consisting of drilling fluids, completion fluids and workover fluids into a wellbore;
   (b) introducing into said wellbore, and from said wellbore into said flow passages, an effective amount of a gel-forming composition comprising
      i. an aqueous solution of polyvinyl alcohol having an average molecular weight of at least 30,000, wherein said polyvinyl alcohol is from about 1.5 to about 5% of the weight of said gel-forming composition,
      ii. an amount of glutaraldehyde from about 0.03 to about 4 percent of the weight of said gel-forming composition, and
      iii. an amount of a crosslinking catalyzing substance, which in combination with said aqueous solution and glutaraldehyde, is operable for effecting gelation, at the temperature of said subterranean formation, of said gel-forming composition in a period of time from about one second to no greater than about 12 minutes after being introduced into said subterranean formation, wherein the pH of said gel-forming composition is no greater than about 5.5, and wherein said gel-forming composition is at least about 91 weight percent brine; and
   (c) allowing said gel-forming composition to enter into said flow passages and to form a gel therein within said period of time mentioned in step (b), thereby reducing the loss of said circulation fluid upon resuming well drilling, completion or workover operation.

17. The process of claim 1, wherein the pH said gel-forming composition is no greater than about 4.

18. The process of claim 1, further comprising prior to introducing said gel-forming composition into said wellbore, the step of introducing a short term plugging agent into said wellbore and into said flow passages to temporarily plug said flow passages until a gel is formed in said flow passages from said gel-forming composition.

19. The process of claim 18, wherein said short term plugging agent is selected from the group consisting of diatomaceous earth, ground-up nut shells, wax beads, and mixtures thereof.

20. The process of claim 1, further comprising the step of introducing cement into said wellbore and from said wellbore into said subterranean formation after introducing said gel-forming composition into said wellbore.

21. The process of claim 1, further comprising the step of introducing a silicate gel-forming composition into said wellbore and from said wellbore into said subterranean formation after introducing said gel-forming composition into said wellbore.

22. The process of claim 19, further comprising the step of introducing cement into said wellbore and from said wellbore into said subterranean formation after introducing said silicate gel-forming composition into said wellbore.

23. The process of claim 1, wherein said first substance is polyvinyl alcohol.

24. The process of claim 1, wherein said amounts of said crosslinking catalyzing substance and said glutaraldehyde are operable for effecting gelation, at the temperature of said subterranean formation, of said gel-forming composition in a period of time from about zero to about 10 minutes after being introduced into said subterranean formation.

* * * * *